United States Patent
Eidenvall et al.

(10) Patent No.: US 7,135,856 B2
(45) Date of Patent: Nov. 14, 2006

(54) METHOD AND DEVICE FOR DETERMINING THE ANGULAR INCLINATION OF A SHAFT IN A ROTATING MACHINE

(75) Inventors: Anders Eidenvall, Västerås (SE); Sten Linder, Västerås (SE)

(73) Assignee: ABB AB, Västerås (SE)

( * ) Notice: Subject to any disclaimer, the term of this patent is extended or adjusted under 35 U.S.C. 154(b) by 42 days.

(21) Appl. No.: 10/481,792

(22) PCT Filed: Jun. 26, 2002

(86) PCT No.: PCT/SE02/01253

§ 371 (c)(1),
(2), (4) Date: Jul. 22, 2004

(87) PCT Pub. No.: WO03/002948

PCT Pub. Date: Jan. 9, 2003

(65) Prior Publication Data

US 2004/0251895 A1  Dec. 16, 2004

(30) Foreign Application Priority Data

Jun. 29, 2001 (SE) .................................... 0102375

(51) Int. Cl.
*G01B 7/30* (2006.01)

(52) U.S. Cl. .............................. 324/207.17; 324/207.25

(58) Field of Classification Search ........... 324/207.15, 324/207.17, 207.25, 207.2, 207.11, 207.12, 324/207.13, 207.16, 207.21, 207.22, 207.23, 324/207.24, 207.26, 228–232, 239–243, 324/163, 166, 173, 174, 178, 179, 260

See application file for complete search history.

(56) References Cited

U.S. PATENT DOCUMENTS

| | | | |
|---|---|---|---|
| 4,405,896 A | 9/1983 | Akita | |
| 4,417,208 A | 11/1983 | Hachtel et al. | |
| 5,059,902 A | 10/1991 | Linder | |
| 5,270,646 A | 12/1993 | Kihlberg et al. | |
| 6,043,644 A | 3/2000 | de Coulon et al. | |
| 6,188,217 B1 * | 2/2001 | Linder | 324/207.17 |
| 6,236,198 B1 | 5/2001 | Linder | |
| 2002/0017902 A1 * | 2/2002 | Vasiloiu | 324/207.17 |

FOREIGN PATENT DOCUMENTS

| | | |
|---|---|---|
| EP | 0305591 | 3/1989 |
| EP | 0337939 | 10/1989 |
| SE | 506154 C2 | 11/1997 |

* cited by examiner

*Primary Examiner*—Edward Lefkowitz
*Assistant Examiner*—David M. Schindler
(74) *Attorney, Agent, or Firm*—Venable LLP; Eric J. Franklin

(57) ABSTRACT

A method, system and inductive device for accurately determining inclination of a shaft arranged with a gear wheel including a plurality of gear teeth. The inductive measuring device includes a transmitter coil and at least two receiving coils arranged adjacent relative an axis of symmetry of the transmitter coil. Voltages in the receiving coils are measured, summed and integrated. A zero value for the integral is used to determine the position of the center line of the gear tooth. The invention may be used for diagnostic and/or control purposes of an internal combustion engine.

7 Claims, 3 Drawing Sheets

METHOD AND DEVICE FOR DETERMINING THE ANGULAR INCLINATION OF A SHAFT IN A ROTATING MACHINE

TECHNICAL AREA

The technical area of the invention lies in the non-contact measurement of position of an electrically conducting material based on electromagnetic induction. The present invention may be used together with a rotating shaft with a substantially regular periphery to measure the angular inclination of the shaft. Such measurements may be used for the management and control of rotating machines including engines. This is particularly useful with large engines that are used for example as ships engines and as stationary engines for driving electrical generators and gas compressors.

TECHNICAL BACKGROUND

The demand for reduced fuel consumption, together with environmental demands concerning chemical composition of exhaust gases increase the requirement to monitor the operation of combustion engines in very close detail. Misfiring influences exhaust gas chemical composition, fuel consumption, and can also negatively influence the working life of a combustion engine. With the help of continuous measurement misfiring can be detected and action be taken to ensure proper functioning is regained With the control of large combustion engines such as for example ships engines, there is a requirement for accurate measurement of the torque in an output shaft. A combination of such a measurement and a measurement of combustion conditions in the cylinders, makes it possible to monitor and control the engine to get higher speeds and lower fuel consumption. Because of the growing demands for reduced consumption of fuel and continually increasing environmental demands on the chemical composition of exhaust gases the requirement to monitor the operation of combustion engines has increased. Misfiring influences exhaust gas chemical composition and can also negatively influence the working life of a combustion engine. With the help of continuous measurement misfiring and other factors affecting engine performance can be detected and action be taken to ensure proper functioning is regained.

However measurement of output shaft torque has to be extremely accurate and quick. The torque must be measured with a repeatable accuracy of fractions of a degree and with a time precision in the area of micro seconds.

Torque measurement may be based on the torque moment in an output shaft. The degree of torque is shown by the twisting along the length of the shaft and depends on measuring the difference between the angular inclination at one end of the shaft compared to the other end.

A known method to measure the angular position a rotating shaft is to mount a angle sensor of a known type on one end of the shaft. Such a method may only be applied when there is a length of shaft available where angular measurement is desired, rather than a shaft that is built-in or enclosed an impractical to reach. Often an output shaft from a machine is long and twists along its length. If one then wishes to measure the position of the shaft at a certain point, the twist up to the end of the shaft may be so great that it introduces serious errors in the measurement if the position of the end is measured. Measurement at a motor end rather than at a drive end of, for example, a long transmission shaft is then to be preferred.

A known method to measure a rotating shaft, which is independent of shaft length, is to apply a regular and legible pattern to the shaft in the place where a measurement is desired. There can for example be regular black stripes on a white background which may be read with an optical technique. Such devices have shown themselves to function well in clean environments but have difficulties in dirtier surroundings. Furthermore, it has been difficult to attach such devices in a satisfactory way to large machines with powerful vibrations and great mechanical forces.

A gearwheel is often mounted in just a position where a measurement is desired. In those cases devices have come into use that have been based on inductive techniques which measure the position of a one or more gear teeth, and through that position, obtain the angular inclination of the shaft. Commonly a large change in magnetic field is detected, which happens when the gear tooth enters the area of the magnetic field, which is to say, that it is the flank of the gear tooth which is detected.

It has been difficult to achieve better than relatively low accuracy with these devices even though the desired accuracy required for regulation of the adjacent apparatus is high. Such devices have not come into as widespread use as has been desired. The low accuracy of these devices depends on that the signal they give is not only dependent on the position of the gear tooth, but also of the appearance of the gear tooth, the distance between gear tooth and measuring device and the magnetic characteristics of the gear tooth. All these parameters may vary from tooth to tooth and with time, depending on that the gear teeth are subjected to wear and deformation while at the same time the gear wheel is seldom perfectly circular.

The inductive devices that have come into use for measurement as described above are based on a sinusoidal variations of a magnetic field. Inductive measurement based on use of a measurement supply current that is suddenly cut off have been described in U.S. Pat. No. 5,059,902 and shown a measurement technique that is more robust and facilitates separation of different characteristics of an object being measured. A difficulty with this measurement device is to determine position of an object being measured when distance to or shape of the object is changed.

In U.S. Pat. No. 5,270,646 a way is shown of how coils may be arranged so that measurement of an edge of a sheet can be carried out. In the same way the edge position of a gear tooth could be measured but a problem with that device is that extensive mathematical calculations are demanded, which leads to a problem with time when used with a rapidly rotating gearwheel. Moreover the calculations demand fast computing capacity, which could make such a device unnecessarily costly in order to measure the position of a gear tooth.

In SE 95035838 a way is shown to arrange coils in order to measure the position of an object. In the case of measurement of gear tooth position with a coil above the gear tooth the device will measure distance to the object but not a position of the object.

SUMMARY OF THE INVENTION

Embodiments of the present invention aim to address one or several of the above mentioned problems. According to one aspect of the invention a method is provided to measure the angular inclination of a shaft such as the shaft of a flywheel.

An object of the invention is to measure rapidly and accurately the position of a metal object, in particular a gear tooth on a gear wheel arranged on a shaft. Another object of the invention is to measure rapidly and accurately the precise inclination of a shaft.

In another embodiment of the invention a method is provided to measure the distance between a point on a shaft and a fixed point where coils are arranged. In yet another embodiment of the invention a method is provided to measure the alignment between an arrangement of coils and a gear tooth on a gear wheel.

In another aspect of the invention an apparatus and system including an inductive measuring device is provided to measure the position of one or more objects such as gear teeth on a gear wheel by detecting the centre of the gear tooth.

The present invention comprises a transmitter coil and two identical receiver coils which are placed above a gear tooth, or another regularly occurring electrically conducting object, and a method wherein the transmitting coil is fed with a constant current that is suddenly cut off, and that the two receiving coils are placed symmetrically in relation to the transmitter coil relative to the direction of movement of the gear tooth, that the signals from both of the receiving coils are subtracted and integrated during specified time periods after current cut off, and so cause the signal to be zero when the gear tooth is at the mid point between the arrangement of coils.

An especially advantageous way to measure the induced voltage in the receiving coils is to integrate the voltage from a time current supply in the transmitter coil is cut off till a time shortly after, as short as possible with respect to the magnetic field energy that will be charged up in the coils, or normally of the order of magnitude 0.2 to 2 microseconds after cutoff. The shortest possible cutoff time causes the measured voltages to be dependent to a much greater extent on physical form and dependent to a much less extent on electrical or magnetic characteristics of the tooth. Thus the method is not sensitive to small local variations in electrical or magnetic properties of each gear tooth.

The inductive measurement device detects the mid position of the gear tooth in relation to the coil arrangement with great accuracy, independent of the distance between coil arrangement and gear tooth, independent of variations in material in one gear tooth compared to another gear tooth, and independent of the shape or appearance of the edges of gear teeth.

The device as described above may be simply adjusted to measure the midpoint of the gear tooth as well as its distance, separation distance, from the coil arrangement. For that purpose the difference of signals from both of the receiving coils is produced, by subtraction, as is the sum of the signals by addition. The sum spells out that distance between gear tooth and coil arrangement and the distance may suitably be read from the sum when the gear tooth is in the middle of the coil arrangement. That sum may advantageously be used in order to make sure that the coil arrangement is adjusted at a suitable distance from the gear teeth.

An important use of the measurement value for distance is to indicate automatically the middle position of the gear tooth when the flywheel is rotating. A zero value for difference indicates that the midpoint is passing, but a second zero value is also obtained when the device is at a point above and between two gear teeth. By making use of a zero value detector which is only activated when the sum of the coil signals is high, a measurement of gear tooth midpoint only is achieved.

The device may be adjusted to measure not only mid point of the gear tooth but also other positions, independent of distance, by means of examining the difference of signals from both of the receiving coils in relation to the sum of the signals. That may be done by, for example, examining a specified position, separate from the mid position, where the difference has a particular value which is in fixed proportion of the value of the sum, or by producing a relation between the difference and sum and where that relationship gives the position of the gear tooth in relation to the mid position.

By a division of each receiving coil into two coils and measurement of the difference between those coil halves, the possible mis-alignment of the coil arrangement may be measured.

The advantage of the invention is that the position of a gear tooth of a gear wheel may be rapidly and accurately determined. This means that the inclination of a shaft on which a gear wheel is mounted on may be determined accurately and quickly enough to regulate, for example, the combustion characteristics of an internal combustion engine while it is running. This in turn means that improved fuel economy may be obtained as well as close control over exhaust emissions. Relatively small savings in fuel and improvements in exhaust composition in percentage terms as a result of improved engine control produce a great benefit in fuel savings and in exhaust gas emission improvements when taken over the whole operating life of an engine.

The present invention is also efficient in operation as it comprises non-moving parts only and requires almost no maintenance. The detection system is not affected by wear, dirt or corrosion of the gear teeth. It is also not affected by changes in the relative shape of one or more gear teeth as it is the centre point to the gear tooth that is detected. Thus the method may be used throughout the service life of the engine. A common problem with earlier attempts to use inductive measurement of gear tooth position was that the material parameters of the gear tooth, such as electrical resistivity and magnetic permeability, had an affect on the way that a signal changed over time. Even in the event that material parameters vary across one and the same gear tooth, a device according to the present invention will still measure mid position correctly. Because the integration time according to the above is short, as mentioned above, it is only the gear tooth surface and size that is measured and not the effect from material parameters, and thus it is not significant for precision of the measurement if material parameters vary over the surface.

The invention may be applied very widely to any motor, old or new.

Other uses for the present invention include the measuring fixed positions of metal objects on a conveyor belt or similar devices, as well as measuring the position of an arm arranged with a regular pattern of metal parts.

BRIEF DESCRIPTION OF THE FIGURES

A more complete understanding of the method and apparatus of the present invention may be had by reference to the following detailed description when taken in conjunction with the accompanying drawings wherein.

DESCRIPTION OF EMBODIMENTS

Figure 1:
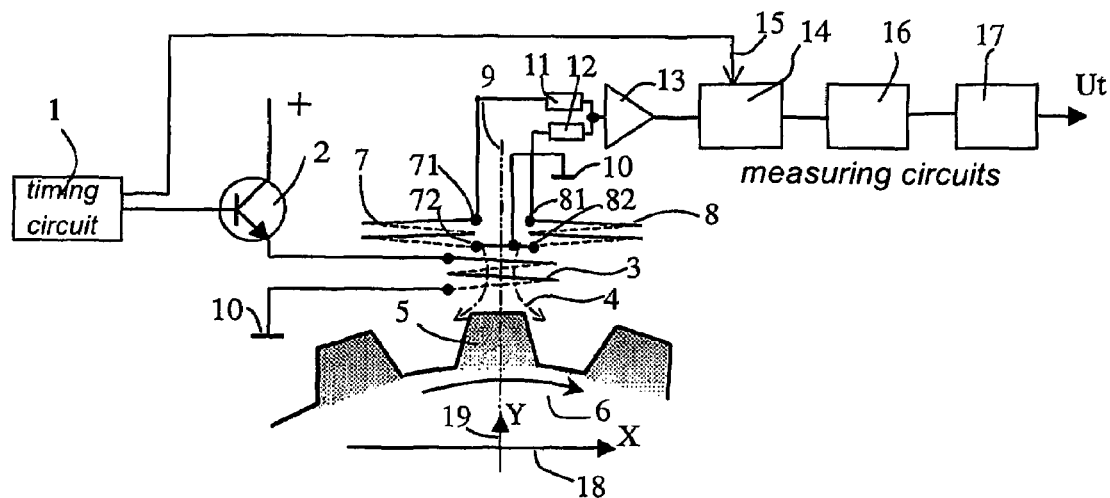
FIG. 1 shows schematically a preferred embodiment according to the present invention.

FIG. 1 shows a gear tooth 5 on a gear wheel (not shown) rotating in a direction shown by arrow 6. A transmitter coil 3 and two receiving coils 7, 8 are arranged in a position relative to gear tooth 5. A timing circuit 1 is electrically connected to a transistor 2, which is further is connected to transmitter coil 3. One end of transmitter coil 3 is also connected to earth 10. Receiving coils 7, 8 are placed symmetrically about an axis of symmetry 9 of the transmitter coil 3. Receiving coils 7, 8 are connected to earth 10 or a defined potential through ends 72, 82. The receiving coils 7, 8 are each connected through their other ends 71, 81 via resistances 11, 12 to an amplifier 13, an integrator 14, a circuit 16 arranged to measure an integrated signal and another circuit 17 arranged to detect change of sign in a signal.

Figure 2:
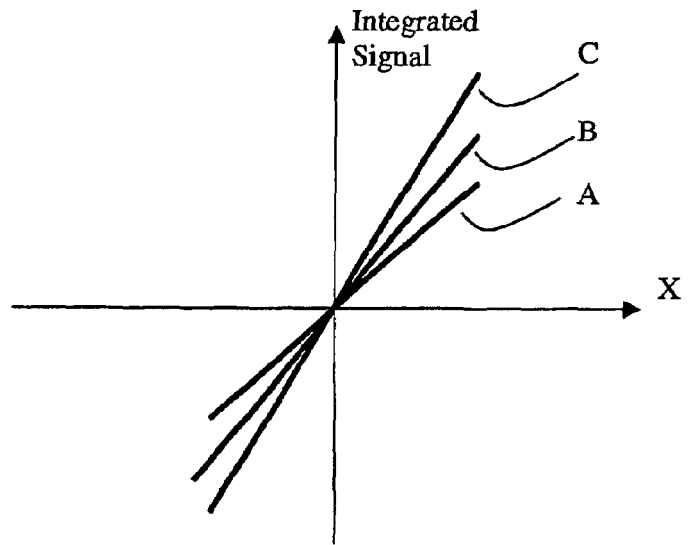
FIG. 2 shows schematically a function of an output signal relative to distance between a gear tooth and a coil arrangement according to the present invention.

FIG. 2 shows an output signal as a function of three different distances A, B and C between the gear tooth 5 and the coil arrangement 3, 7, 8.

A preferred embodiment of an inductive measuring device or meter according to the present invention is shown in FIG. 1. An arrangement of coils 3, 7, 8 is positioned above a gearwheel (not shown) that includes a gear tooth such as gear tooth 5 at the periphery of the gearwheel.

A constant current in transmitter coil 3 is generated by switching on the transistor 2, for which the time period of the switching is regulated by the timing circuit 1. When the transistor 2 is switched on, a current is made to flow from the positive side of the transistor 2 through the transmitter coil 3 and down to earth. When the current flow has continued for a sufficiently long time that a voltage across the transmitter coil 3 is substantially constant, the current is stopped suddenly by changing a regulating signal from timing circuit 1. A substantially constant magnetic field 4 has thereby built up in the area around transmitter coil 3 and around the nearest gear tooth 5 on the gearwheel. The gearwheel rotates relative to transmitter coil 3 in the direction of the arrow shown as 6.

The process of current supply and flow followed by stopping current flow is repeated in regular time periods so that a substantially continuous measurement is maintained. Length of the time period is determined by the time required for updating, that is, the desired frequency of updating. For gear teeth with, for example, a size of 1 centimeter high and a typical velocity of 10 m/s a time period of 10 microseconds may be considered suitable.

With the sudden cessation of the generating current flowing in transmitter coil 3 a current is induced in the gear tooth surface. That current has associated with it a secondary magnetic field, which reaches up to receiving coils 7, 8 where it induces a voltage in those receiving coils 7, 8. The gear tooth may be though of as having a motion in the direction 6 following the rotation of the gearwheel. A position of the gear tooth 5 in the horizontal plane relative to the axis of symmetry 9 of transmitter coil 3 is given by an imaginary x-axis 18 with an origin or zero point in the axis of symmetry 9 of the transmitter coil 3.

The nearer a particular receiving coil such as 7 or 8 is placed in the x-direction to the gear tooth, the greater is the voltage induced in that coil. Thus a greater voltage $V_L$ is induced across the left side receiving coil 7 than a lesser voltage, $V_R$ induced across the right side receiving coil 8 while the centre of the gear tooth 5 is on the left side of the axis of symmetry 9, that is, when x has a negative value. When the gear tooth lies symmetrically relative to the axis of symmetry 9, and x=0, voltages of the same magnitude where $V_L=V_R$ are induced over both receiving coils 7, 8.

In this embodiment the receiving coils 7, 8 are so connected that the voltages induced across both receiving coils are subtracted from each other. That is to say, following the conductors connecting between receiving coils 7, 8, both receiving coils 7, 8 are wound in an opposing direction in the plane parallel to the tangential direction of the gearwheel. Accordingly both of the mutually connected ends 72, 82 of receiving coils 7, 8 are connected to earth 10 or another defined potential. The receiving coils 7, 8 are summed at their other ends 71, 81 across two resistances 11 and 12, and connected to an amplifier 13. The amplifier 13 is arranged to detect the difference $V_L-V_R$ between voltages $V_L$, $V_R$ induced in receiving coils 7 and 8 respectively.

The signal from the amplifier 13 is sent to a time regulated integrator 14. Time regulation of the integrator 14 is carried out by a control signal 15. Control signal 15 zeroes the integrator 14 immediately before the cutoff of current in the transmitter coil 3, and starts the integrator 14 simultaneously with the switch on of current. Integrator 14 integrates the signal for a short time, called the integration time. The integration time is typically a short time, so short that the change in the magnetic field with cutoff of current supply in transistor 2 does not have time to penetrate in to the gear tooth, typically a microsecond or shorter. Circuit 16 measures the signal after integration in the integrator 14 and that measurement value is then called an integrated signal. When that integrated signal changes sign the circuit 17 sends a distinct signal, Ut, from an inactive to an active signal, indicating that the centre of the gear tooth 5 has passed the axis of symmetry 9 of transmitter coil 3 in the coil arrangement.

The device described above is not limited to the embodiment that has been described but may instead according to general principles disclosed result in a number of different practical embodiments. For example the receiving coils 7, 8 may be connected to each other in series and have the same winding direction, but then be measured differentially in the first amplifier.

FIG. 2 shows the integrated signal that may be measured from circuit 16 according to FIG. 1, when the gear tooth 5 moves in the x-axis 18 direction. FIG. 2 describes that as an Integrated Signal dependent on the position of the centre of the gear tooth 5 relative to the x-axis 18, with zero points for both axes at their intersection. Depending on the distance in the Y-direction, shown as y-axis 19 in FIG. 1, between receiving coils 7, 8 and gear tooth 5, different functions are generated, as illustrated by lines indicated as A, B and C. In FIG. 2 letter A represents a large distance, B a normal distance and C a small distance between gear tooth 5 and the coil arrangement 3, 7, 8. The dependencies are different, but have a common intersection in that x=0 when the signal is 0. By following the signal while the gear tooth moves, and indicating when the signal changes sign, it is possible to indicate a specific position of the gear tooth 5. The change in the signal from negative signal to positive signal is detected by circuit 16 in FIG. 1.

Figure 3:
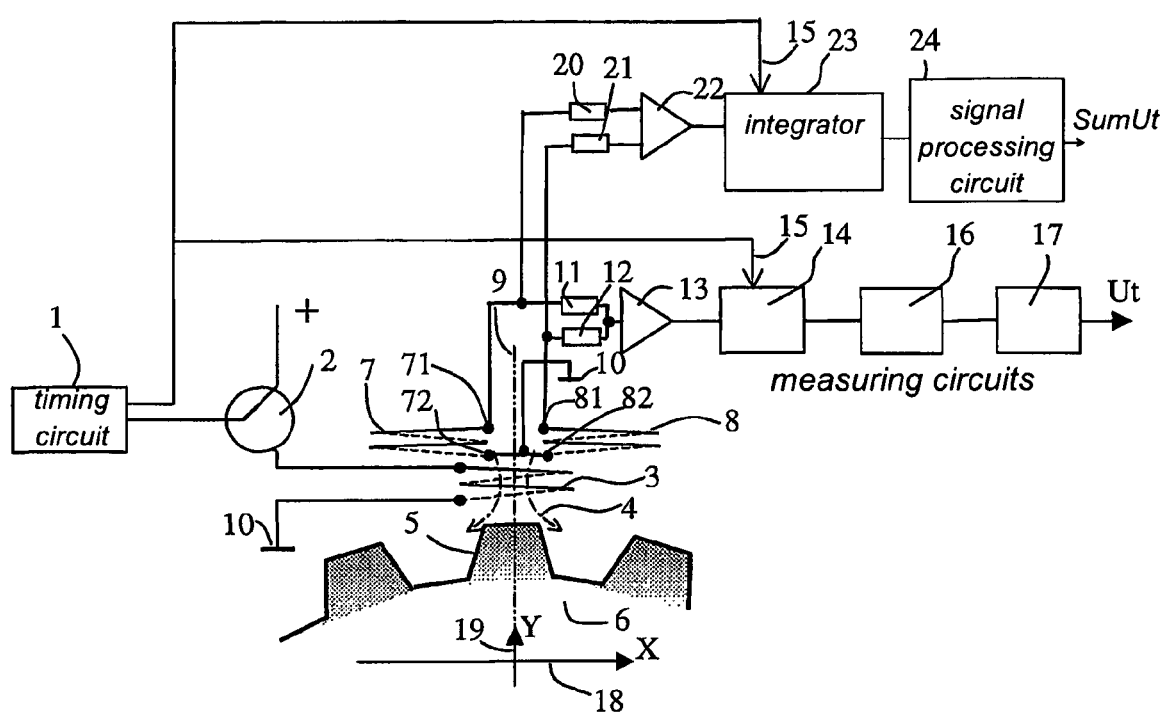
FIG. 3 shows an alternative embodiment of the present invention with measurement and signal summation.

An embodiment according to FIG. 3 may also be used to obtain information at the same time on the distance between the coil arrangement and the gear tooth. The embodiment according to FIG. 3 comprises the embodiment of FIG. 1 as well as a parallel receiving channel where the signals from the coil ends are subtracted instead of added. That is accomplished by the two additional resistances 20, 21 connected to the receiving coils 7, 8 as well as connecting each resistance to an input of a differential amplifier 22. By this means the difference of the difference, or the sum, is taken of the signals from the receiving coils 7, 8. The signals are then processed in a further signal channel where an integrator 23, regulated by a control signal 15, which integrates for a short time after current cutoff in the transmitter coil 3, and a signal processing circuit 24 which gives the value of the signal after integration, SumUt, a value which is a measure of the distance of the coil arrangement 3, 7, 8 from the gear tooth 5.

Figure 4:
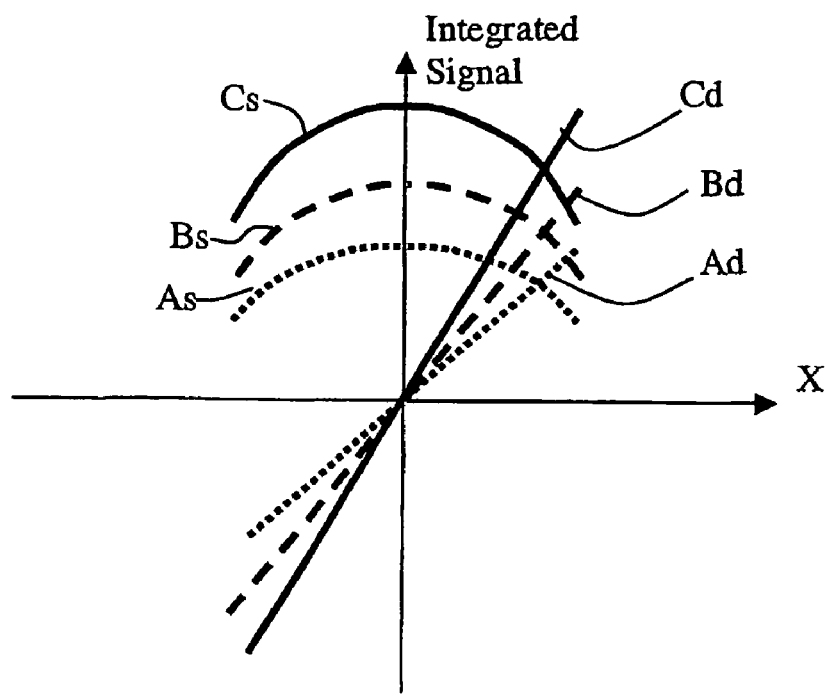
FIG. 4 shows schematically a function of output signal and distance between gear tooth and coil arrangement according to the alternative embodiment shown in FIG. 3.

In FIG. 4 it is shown how a difference signal Cd, Bd, Ad, and a summation signal Cs, Bs, As vary when a gear tooth 5 passes the coil arrangement 3, 7, 8. The diagram in FIG. 4 has the same axes as the diagram of FIG. 2. During the time when the gear tooth passes the coil arrangement, the diagram shows that for:

a large distance between the coil arrangement and the gear tooth, results in the relation Ad, which is the integrated signal from circuit 16 as a measure of the difference and As which is an integrated signal of the sum from circuit 24;

a normal distance results in relations Bd and Bs respectively;

a short distance results in relations Cd and Cs respectively.

The sum integral from circuit 24 when the gear tooth is in the middle of coil arrangement, at x=0, varies in the same way with distance between gear tooth and coil arrangement as the slope of the difference integral.

Both changes over time of the signal may be used according to FIG. 3 in several ways which increase the usefulness of the invention.

For example the relation between the integral of the difference and the sum may be taken in a suitably adjusted circuit to obtain a relation which does not vary with distance between gear tooth 5 and coil arrangement 3, 7, 8. This may be used in order to detect, in addition, the centre point of the gear tooth 5 as a continuous movement in a direction, x-direction.

Also the value of the sum of the integral when the gear tooth is detected passing through the mid point may be used to check that the coil arrangement 3, 7, 8 is installed at a suitable distance from the gear teeth in the gear wheel.

Another way to use the two signals, the integral of the difference and the sum, is to use a detection circuit to detect when the difference Ad, Bd, Cd in FIG. 3, are zero. Those zero values are dependent on that the signal sum As, Bs, Cs has reached a certain value. That value is exceeded only when the gear tooth is underneath the coil arrangement. In other cases the sum of the signal is lower than that value, indicating that the gear tooth is not underneath the coil arrangement, and zero values in the difference is not indicated. Zero point transitions when the coil arrangement is positioned over and between two gear teeth are therefore not indicated and such positions do not disturb measurement of the middle points of gear teeth.

In some cases where the invention may be used in which very great accuracy of detection is significant, it is important that the coil arrangement is placed parallel with the gear teeth.

Figure 5:
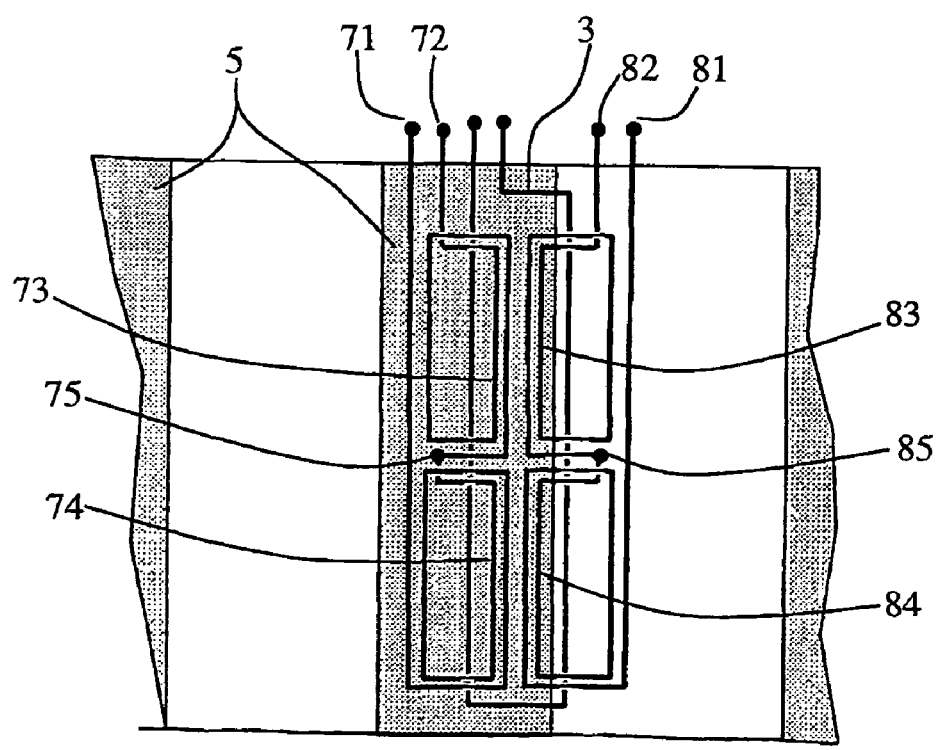
FIG. 5 shows another alternative embodiment of the present invention with measurement of alignment of coil arrangement and gear teeth included.

A preferred embodiment of the invention is shown schematically in FIG. 5. FIG. 5 shows a view from above, of gear teeth 5, transmitting coil 3, two sets of receiving coils 73, 74 and 83, 84. The coils are advantageously arranged to lie all in the same plane perpendicular to the axis of symmetry 9 of FIG. 1. The coils and gear tooth 5 seen from above along the y-direction of FIG. 1, and where each of the two receiving coils of FIG. 1 are separated into two further coils.

Transmitting coil 3 has a shape that conforms to the device in FIG. 1 but the receiving coils 7, 8 with connection points 71, 72 for the first coil and 81, 82 for the second of FIG. 1 are separated into the two similar sized coils shown connected in series, 73 and 74 respectively and 83, 84 respectively in a plane perpendicular to the x-y plane according to FIG. 1 with middle connection points 75 and 85. By means of adding the signals across the resistance from the outer ends of an entire receiving coil, 71, 72 and 81, 82 respectively, and then taking the difference between that sum and the double receiving coils 73, 74 and 83, 84 middle point in a differential amplifier, any possible geometric mis-alignment between the coil arrangement and gear tooth may be measured. The difference that is obtained is handled in the same way as the formation of a sum in the circuits 23 and 24 according to the device in FIG. 3. The integrated signal which is thereby obtained will show a zero value when the coil arrangement and the gear tooth are not miss-aligned and a value when they are mis-aligned. Such a signal may be used for the mechanical adjustment of the coil arrangement during installation and or maintenance.

In addition to measuring the position of a gear tooth in the x-direction, the other measurement functions as described in the embodiments may advantageously be used in order to detect error in the movement, progress, travel of the gear wheel, and therefore errors in the machine in which it is mounted. Changes within a revolution in the integrated signal sum and in alignment may be analysed and used to describe the movement of the gear wheel. Such changes or trends may be used to detect for example an increase in vibration, or of wear, or presence of carbonisation or other build-up that have a significance for engine performance, exhaust emission constituents, fuel economy, maintenance and repair requirements or service life.

A further way to use the coil arrangement described in FIG. 5 is for detection of a certain gear tooth on the flywheel or ring gear, for example as a reference gear tooth. In this case some material is deliberately removed from the gear tooth that is to be individually detected, for example by drilling a hole in the tooth or by grinding away part of the tooth surface. This is done to one side only of the gear tooth so that less material will be underneath coil 73 than under coil 74 (or vice versa) of FIG. 5. A measurement of difference between the coils 73 and 74 (or 83 and 84) thereby gives a clear indication when the particular gear tooth is under the coil arrangement.

The various out signals generated by embodiments of the invention, such as Ut, SumUt, may take the form of a computer data signal embodied in a data communication. This data signal thus comprises information about the angular inclination a shaft or a flywheel on a shaft of an internal combustion engine. The signal may also comprise a calculated value of torque or a function of work output. The signal may be communicated to a circuit in the same physical unit, circuit board or chip. The communication may as well by sent over a communication means to a separate control unit or engine management unit. The communication means may comprise any communication device or communication network such as a simple wire connection, a cable network, a fieldbus, and a mixed network including a wireless link. The information in the computer data signal may be encoded, at least in part, compatible to a XML (eXtensible Markup Language) standard.

In another aspect of the invention the method is carried out by computer program code portions contained in a computer software. A computer or microprocessor other means hereafter called a processor may be used to carry out steps of the method by means of one or more computer program code portions. The computer program code portions contains one or more formulae or algorithms according to the method of the present invention so that the offset between expected and actual position in a cylinder can be determined, an accurate value for IMEP etc calculated, and control actions taken dependent on the calculated value for IMEP. The computer code portions may be stored in or on any type of computer readable media, including as firmware in devices such as a chip, in a ROM (Read Only Memory), a Programmable Read Only Memory (PROM), an Eraseable Programmable Read Only Memory (EPROM), in a flash memory, or in any other non-volatile or permanent storage. Data such as operational measurements provided by use of the invention as well as values calculated from operational measurements, and set point values may also be stored in data storage means such as the above and/or data servers for purposes of analysis, record-keeping and certification, maintenance histories and so on.

It is also noted that while the above describes exemplifying embodiments of the invention, there are several variations and modifications which may be made to the disclosed solution without departing from the scope of the present invention as defined in the appended claims.

The invention claimed is:

1. A method of rapid and accurate detection of the midpoint of a metal object, the method comprising:
    arranging a coil arrangement comprising at least one transmitter coil and two receiver coils near a gearwheel,
    feeding the at least one transmitter coil with a current,
    cutting off the current to the at least one transmitter coil,
    detecting a difference between induced voltages of the receiving coils,
    integrating the difference during a fixed time period starting after current cut off, and
    detecting when the integral is zero, thereby indicating that the midpoint of a gear tooth is passing the coil arrangement.

2. The method according to claim 1, further comprising:
    summing the induced voltages of the receiving coils,
    integrating the sum during a short time period starting after current cut off, and
    generating a signal as a measure of a distance between the coil arrangement and the gearwheel and/or the gear tooth.

3. The method according to claim 1, further comprising:
    generating a signal when the integral of the difference between the induced voltages of the receiving coils is zero,
    detecting that the signal exceeds a predetermined value, and
    determining, when the signal is zero, that the midpoint of the gear tooth is passing the coil arrangement.

4. An inductive measuring device and system for rapid and accurate detection of the midpoint of a metal object, the system comprising:
    a coil arrangement comprising at least one transmitter coil and two receiving coils arranged spaced apart and substantially symmetrically located in relation to the at least one transmitter coil,
    a timing circuit,
    an amplifier,
    an integrator,
    means arranged to detect a difference between induced voltages of the receiving coils,
    means arranged to integrate this difference during a fixed time period, and
    means arranged to detect when this integral is zero, thereby indicating when the midpoint of a gear tooth is passing a specific position.

5. The inductive measuring device and system according to claim 4, further comprising:
    means arranged to sum the induced voltages in the receiving coils,
    means arranged to integrate this sum during a short time period, and
    means is arranged to generate a signal when a distance between the coil arrangement and a gearwheel and/or the gear tooth exceeds a predetermined value.

6. The inductive measuring device and system according to claim 4, further comprising:
    means arranged to generate a signal when the integral of a difference between the induced voltages of the receiving coils is zero, and
    means arranged to detect when the signal exceeds a predetermined value, and when the signal is zero indicating that the midpoint of a gear tooth is passing the coil arrangement.

7. A computer program product, comprising:
    a computer readable medium; and
    computer program instructions recorded on the computer readable medium and executable by a processor for carrying out the steps of
    arranging a coil arrangement comprising at least one transmitter coil and two receiver coils near a gearwheel;
    feeding the at least one transmitter coil with a current;
    cutting off the current to the at least one transmitter coil;
    detecting a difference between induced voltages of the receiving coils;
    integrating the difference during a fixed time period starting after current cut off; and
    detecting when the integral is zero, thereby indicating that the midpoint of a gear tooth is passing the coil arrangement.

* * * * *